(12) United States Patent
Bernholc

(10) Patent No.: US 11,636,461 B2
(45) Date of Patent: Apr. 25, 2023

(54) CARD READER TERMINAL WITH EXTERNAL CONTACTLESS ANTENNA

(71) Applicant: PayPal, Inc., San Jose, CA (US)

(72) Inventor: Daniel Bernholc, Stockholm (SE)

(73) Assignee: PayPal, Inc., San Jose, CA (US)

( * ) Notice: Subject to any disclaimer, the term of this patent is extended or adjusted under 35 U.S.C. 154(b) by 30 days.

(21) Appl. No.: 16/074,212

(22) PCT Filed: Jan. 27, 2017

(86) PCT No.: PCT/EP2017/051756
§ 371 (c)(1),
(2) Date: Jul. 31, 2018

(87) PCT Pub. No.: WO2017/137265
PCT Pub. Date: Aug. 17, 2017

(65) Prior Publication Data
US 2019/0392416 A1 Dec. 26, 2019

(30) Foreign Application Priority Data

Feb. 9, 2016 (SE) .................................... 1650161-1

(51) Int. Cl.
*G06Q 20/32* (2012.01)
*G06K 7/10* (2006.01)

(52) U.S. Cl.
CPC ....... *G06Q 20/327* (2013.01); *G06K 7/10297* (2013.01)

(58) Field of Classification Search
CPC .................................................. G06Q 20/327
(Continued)

(56) References Cited

U.S. PATENT DOCUMENTS

| 2005/0006471 A1 | 1/2005 | Beddell, Jr. et al. |
| 2010/0026498 A1* | 2/2010 | Bellows ............. G06K 7/10386 340/572.7 |

(Continued)

FOREIGN PATENT DOCUMENTS

| WO | 1996008794 A1 | 3/1996 |
| WO | 2008070638 A2 | 6/2008 |

OTHER PUBLICATIONS

International Search Report and Written Opinion for corresponding International Application No. PCT/EP2017/051756 dated Mar. 30, 2017.

(Continued)

*Primary Examiner* — Rafferty D Kelly

(57) ABSTRACT

A secure arrangement for performing secure contactless payments includes an external contactless card reader comprising a short-distance communication antenna. The secure arrangement comprises a card reader terminal comprising a secure controller configured for performing financial transactions, wherein the secure controller is located in a secure area within the card reader terminal, an external contactless card reader comprising a short-distance communication antenna configured for converting an electromagnetic signal comprising card data, received from a contactless payment card, into an analogue signal and a feed line configured for transferring the analogue signal between the external contactless card reader and the card reader terminal. The secure area in the card reader terminal comprises an A/D converter for digitizing the analogue signal to a digital signal that can be processed by the secure controller, within the secure area.

12 Claims, 4 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2012/0126011 A1* | 5/2012 | Lamba | G06Q 20/322 |
| | | | 235/449 |
| 2012/0168504 A1 | 7/2012 | Phillips | |
| 2014/0065948 A1* | 3/2014 | Huang | H04B 1/3888 |
| | | | 455/7 |
| 2015/0012440 A1 | 1/2015 | Kelley et al. | |
| 2015/0172426 A1* | 6/2015 | Asrani | H04B 1/3888 |
| | | | 455/77 |
| 2015/0193766 A1 | 7/2015 | Martinez de Velasco Cortina et al. | |
| 2016/0345123 A1* | 11/2016 | Lamba | H01Q 1/2216 |

OTHER PUBLICATIONS

International Preliminary Report on Patentability for corresponding International Application No. PCT/EP2017/051756 dated Jan. 19, 2018.

Office Action received in corresponding Swedish Application No. 1650161-1 dated Aug. 29, 2016.

* cited by examiner

11,636,461 B2

CARD READER TERMINAL WITH EXTERNAL CONTACTLESS ANTENNA

This application is a national phase of International Application No. PCT/EP2017/051756 filed Jan. 27, 2017 and published in the English language, which claims priority Swedish Patent Application No. 1650161-1 filed Feb. 9, 2016, which are hereby incorporated herein by reference.

TECHNICAL FIELD

The disclosure pertains to the field of secure electronic payments. More particularly the disclosure relates to a secure arrangement for performing secure contactless payments, with an external contactless card reader.

BACKGROUND

In today's commerce, merchants often utilize so called point-of-sale, POS, devices, including mobile POS, mPOS, devices to process financial transactions, in particular credit card payments.

POS terminals are connected, usually with wires, to a cash register and to an internet connection. Some terminals process chip cards. In such terminals a card is inserted into the terminal and the user enters a Personal Identification Number, PIN, on a keypad of the terminal. Other terminals process magnetic stripe cards. In such terminals the card is swiped through a slot.

Recent POS terminals also provide support for payments using a short distance wireless technology such as Near Field Communication, NFC, for communicating with the credit card. NFC, allows for wireless communication between two devices in close proximity to each other.

In the contactless solutions, the POS terminal is equipped with a short-distance communication antenna configured for converting an electromagnetic signal comprising card data, received from a contactless payment card, into an analogue signal.

The antenna, which defines the "tap zone", where the user needs to "tap" his or her credit card, is traditionally placed on the card reader device e.g. a POS terminal. Generally POS terminals have a delimited area where a customer must tap their card or device to achieve a successful read. This identified area is referred to as the tap zone or landing zone. The tap zone must be a clearly distinguishable area on the POS terminal and the contactless symbol must be placed in the center of the tap zone at the terminal. The Contactless Reader (or PCD) is e.g. part of a cardholder-facing display that includes visual status indicators (such as lights or LEDs) and a beeper.

However, a tap zone located on the card reader may be difficult to reach. It may also be difficult for a user to understand where he/she should tap his/her card, as the antenna may for security or implementation reasons, be located such that the center of the tap zone is e.g. in the center of the key board. Hence, there is a need for improved solutions, where usability of contactless payments is improved.

SUMMARY

An object of the present disclosure is to provide a wireless device which seeks to mitigate, alleviate, or eliminate one or more of the above-identified deficiencies in the art and disadvantages singly or in any combination and to provide a solution wherein usability is improved while keeping security and cost at a reasonable level.

This object is obtained by a secure arrangement for performing secure contactless payments comprising a card reader terminal, an external contactless card reader and a feed line. The card reader terminal comprises a secure controller configured for performing financial transactions, wherein the secure controller is located in a secure area within the card reader terminal and the external contactless card reader comprising a short-distance communication antenna configured for converting an electromagnetic signal comprising card data, received from a contactless payment card, into an analogue signal. The feed line configured for transferring the analogue signal between the external contactless card reader and the card reader terminal. Furthermore, the secure area in the card reader terminal comprises an A/D converter for digitizing the analogue signal to a digital signal that can be processed by the secure controller.

The secure arrangement provides for a solution where it is convenient for the customers to make a payment, as the merchant may move the tap zone to a desirable position. Today, the contactless antenna is part of the card reader and often it is less evident to the customer where to place the card or device. It might not even be clear to the customer that it is possible for them to pay using a contactless card or device. By connecting the external antenna to the card reader with a cable, the analogue signal is kept all the way to a secure area in the card reader. Thereby, no additional exposure of the card data is caused by the secure arrangement. This makes the solution very cheap as all the additional security related aspects when converting the data into digital form may be omitted.

According to some aspects, the external contactless card reader comprises at least one antenna matching circuit positioned between the short-distance communication antenna and the A/D converter. The antenna matching circuit is configured for matching the frequency characteristics of the short-distance communication antenna with frequency characteristics of the feed line, or with frequency characteristics feed line in combination with frequency characteristics of a connection point of the feed line in the card reader terminal. Thereby power transfer may be maximized and effects of the load are mitigated.

According to some aspects of the proposed disclosure, the secure area of the card reader terminal comprises a short distance receiver circuitry and wherein A/D converter is located inside the short distance receiver circuitry.

According to some aspects, the short-distance communication antenna in the external contactless card reader is a first short-distance communication antenna and wherein the card reader terminal comprises a second short-distance communication antenna and wherein the first and second short-distance communication antennas are both connected to the short distance receiver circuitry. The solution enables hardware to be reused by both the short distance antennas.

According to some aspects, the card reader terminal comprises a switch arrangement configured to connect at least one of the first and second short-distance communication antennas to the receiver circuitry. Thus the merchant may select between the antennas in a simple way.

According to some aspects, the card reader terminal comprises at least one antenna matching circuit for matching frequency characteristics of the second short-distance communication antenna with frequency characteristics of a connection point in the card reader terminal and/or frequency characteristics of the feed line, or frequency characteristics of the feed line in combination with frequency characteristics of a connection point of the feed line in the external contactless card reader, with the frequency characteristics of a connection point of the feed line in the card reader terminal.

According to some aspects, the secure area is tamper proof. Having the secure area tamper proof results in e.g. that secure data stored therein cannot be accessed by an unauthorised person.

According to some aspects, the external contactless card reader comprises an electromagnetic shield for protecting its internal circuitry, including at least the short-distance communication antenna, from magnetic and/or electromagnetic interference. The electromagnetic shield may comprise a metallic layer shielding the short-distance communication antenna from an underlying surface and, optionally, a ferrite layer arranged between the antenna and the metallic layer to optimize operation of the external contactless card reader in metal environments.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
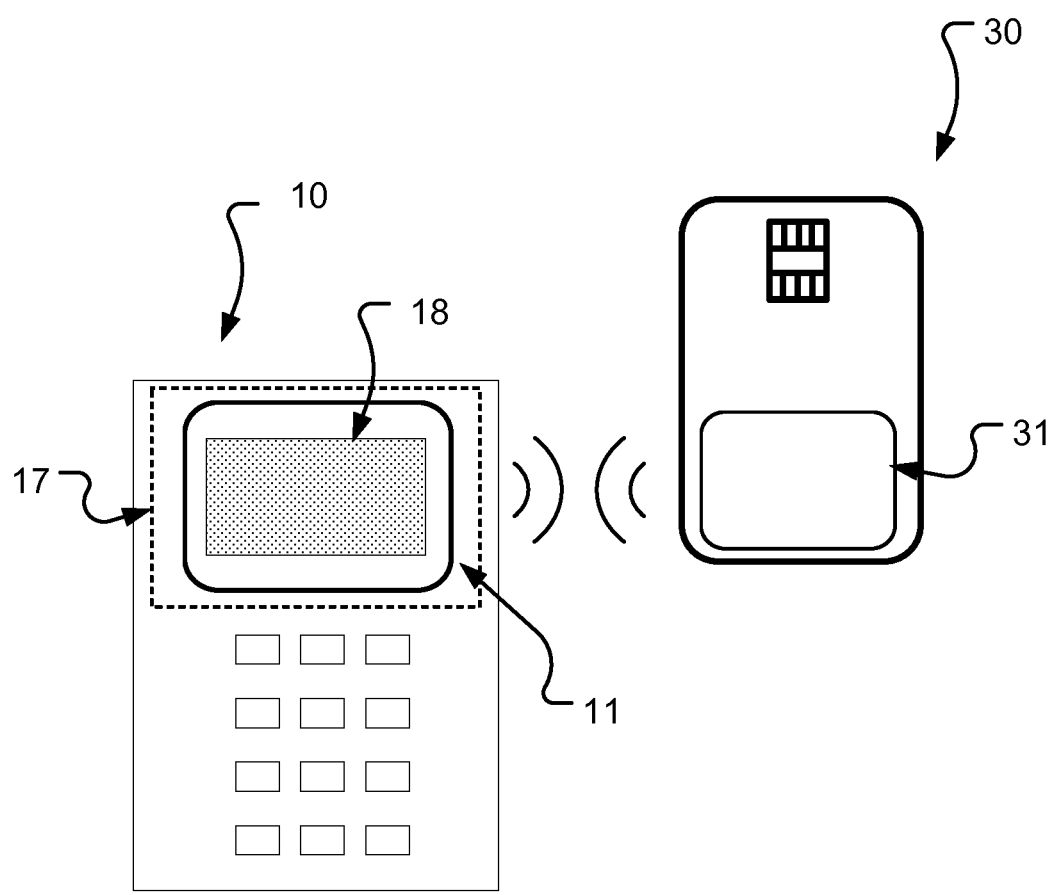
FIG. 1 illustrates a contactless payment.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1 illustrates a contactless payment. FIG. 1 shows an arrangement comprising a card reader terminal 10 and a contactless payment card 30. The card reader terminal 10 may be a traditional POS terminal or it may be a so called mPos, i.e. a mobile point of sale.

A point of sale terminal, POS terminal, is an electronic device used to process card payments at retail locations. A POS terminal is generally configured to read the information off a customer's credit or debit card. The card interface may be e.g. a chip card interface, a magnetic stripe card reader or an interface for reading contactless cards using Near Field Communication, NFC. Advanced POS terminals are typically equipped with a combination of these interfaces.

The POS typically also connects to an acquiring bank to check whether the funds in a customer's bank account are sufficient or it decides that the transaction may be approved without checking the funds. The POS then transfers the funds from the customer's account to the seller's account or at least, accounts for the transfer with the credit card network. POS terminals may also be configured to record the transaction and to provide a digital or printed receipt.

An mPos is e.g. a smartphone, tablet or dedicated wireless device that performs the functions of a cash register or electronic point of sale terminal.

Near Field Communication, NFC, is a standards-based connectivity technology that establishes wireless connection between two devices in close proximity of each other (e.g., most commonly when the devices are within 0-4 centimetres from each other and theoretically the devices can be up to 20 centimetres apart). NFC allows users to transfer information by touching, or tapping, one device with another device. The act of bringing one NFC-enabled device to close proximity of another NFC-enabled device with or without the two devices physically contacting each other is referred to as "NFC bump" or "NFC tap" hereinafter. It may also be more generally called "bumping" or "tapping".

The POS terminal in FIG. 1 comprises an interface for reading contactless cards. The interface typically comprises an NFC antenna 11 and an NFC controller (not shown). The NFC antenna in the POS terminal communicates with a NFC antenna 31 in the contactless card 30, whereby credit card information required to perform an electronic payment such as an EMV payment is exchanged, see EMV® Contactless Specifications for Payment Systems, Version 2.5 March 2015.

Hence, the operation of POS terminals is generally controlled by standards such as PCI and already mentioned EMV. Payment Card Industry, PCI, Data Security Standard are technical and operational requirements set by the PCI Security Standards Council, PCI SSC, to protect cardholder data. The PCI standards also define requirements for protection of secure data in the POS terminal upon entry.

As discussed above, the traditional placement of the NFC antenna under the upper side of a card reader terminal may cause trouble to the user when tapping the card, as the card reader may e.g. be out of reach of the customer. Hence, providing freedom to the merchant to place the NFC antenna in other places may be desirable. This may be accomplished by separating the NFC antenna from the card reader terminal.

Published patent application US 2012/168504 A1 discloses two part contactless readers comprising a base unit and a customer facing unit. The customer facing unit that may contain a contactless antenna, may e.g. be placed on a disk. The purpose of the teaching of is to overcome the need for any direct connection between the customer-facing unit and the base unit, as it may be desirable to place them e.g. on opposite sides of a counter.

The electronic circuitry in the base unit may be substantially conventional except that, in some embodiments, it may include structure for inductive coupling to the customer-facing unit and/or for wirelessly transmitting power to the customer-facing unit. However, such a solution limits the freedom of the merchant to place the units both in horizontal and vertical direction with regards to each other, because then the inductive coupling is lost.

US 2012/168504 A1 also presents an alternative solution where the electronic components in the base unit may include one or more devices for implementing a radio or optical communications link to the customer-facing unit. With this solution the base unit may be separated from the customer unit with a larger distance provided that a radio or optical communications link is used. However, when using a radio or optical communications link for transferring sensitive card data is a security risk, as the signal read from the contactless card needs to be demodulated and decoded in the customer facing unit before is its sent to the base unit. Hence, additional encryption is required, which requires extra components and processing. In accordance with the PCI standard the path of contactless data must be secured to 16 points attack potential from the point of digitisation of the data.

"Attack potential" is a term that appears often in the documentation published by the PCI Security Standards Council, PCI SSC. Attack potential is a numeric value that refers to the security vulnerability of a given piece of equipment. The higher the number, the more secure the device.

Figure 2:
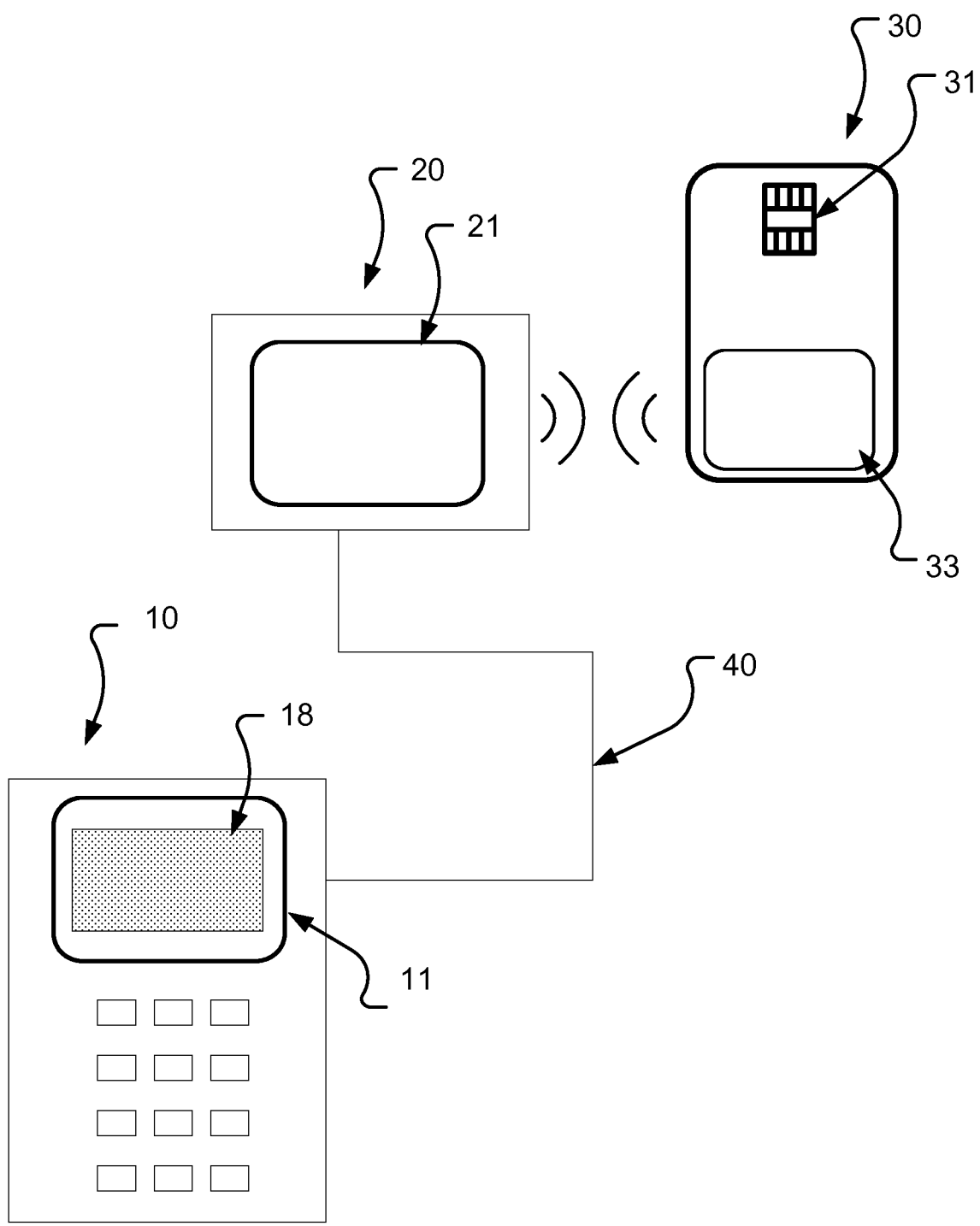
FIG. 2 illustrates a payment using a card reader terminal equipped with an external short-distance communication antenna.

In order to solve the need for additional security, and still keep the freedom regarding how to position the antenna 21 in relation to the card reader terminal 10 a secure arrangement is proposed. The principle, which is illustrated in FIG. 2, is to provide the antenna in an external contactless card reader 20 which has a physical connection 40 to the card reader terminal 10. The system then needs to be configured such that signals received by the short distance antenna can propagate all the way to the card reader terminal, without intermediate digitisation. Hence, digitisation takes place within a secured area in the card reader terminal 10. In this way a simple solution is provided where no digital signal comprising card data is exposed, i.e., allowed to propagate without the possibility of being wire-tapped. Hence, the need for additional encryption is avoided. The analogue signal provided by the antenna can easily be isolated. If the feed line is a coaxial cable then the analogue signal only propagates between the inner conductor and the tubular insulating layer. Hence, there is no additional exposure of the signal transmitted by the contactless card, except at the transmission from the card, which is limited in time and place.

One example is donations. It may be desirable to enable a customer to make a donation using a contactless card. However, it can be inconvenient if the contactless tap zone is on the card reader, if the card reader terminal is positioned out of reach of the customer. For example the donation may be given at entry/exit in a store, while the POS reader might be located at the desk.

A contactless collection box may then be connected to a POS terminal. In such a case it is potentially desirable to have two or more short distance antennas working simultaneously. For example one short distance antenna is positioned on the actual POS terminal and one on the collection box.

Figure 3:
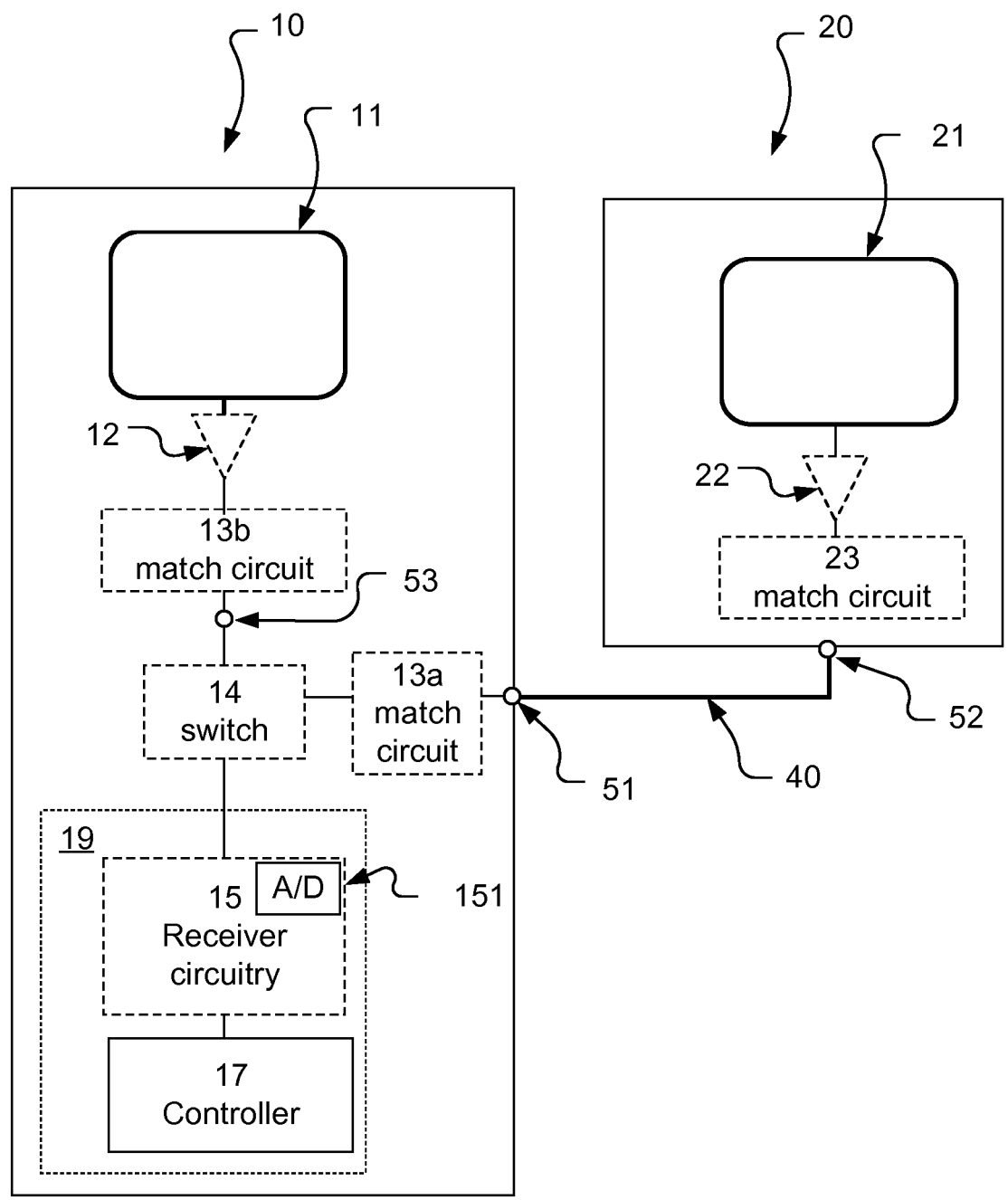
FIG. 3 illustrates a secure arrangement according to some embodiments of the invention.

The secure arrangement will now be further described referring to FIG. 3. The scenarios generally apply to situations when a merchant holds a POS or mPOS terminal and the customer has a contactless card that is to be tapped on the POS. As mentioned above, an object of the proposed technique is to implement an external antenna pad providing more convenience to customers to tap their contactless card that fulfils security requirements with limited or no addition of cost.

FIG. 3 shows a secure arrangement for performing secure contactless payments. The secure arrangement comprises a card reader terminal 10, an external contactless card reader 20 and a feed line 40.

A contactless card or contactless smartcard is a smart card that uses radio signals to provide a wireless connection to a card reader, so that no physical contact is necessary. Typically a contactless smart card has dimensions of credit-card size. Its embedded integrated circuits can store and sometimes process data and communicate with a terminal via radio waves e.g. 13.56 MHz.

The card reader terminal 10 comprises a secure controller 17 configured for performing financial transactions, such as contactless payments. One example is the EMV contactless payments in accordance with the EMV specification (see www.emvco.com). For security reasons the secure controller 17 is located in a secure area 19 within the card reader terminal 10. Thereby, sensitive information cannot be reached by an unauthorized person. Typically the secure area is tamper proof, which means that the secure area is tamper resistant. Tamper resistance is resistance to tampering (intentional malfunction or sabotage) by either the normal users of a product, package, or system or others with physical access to it. Tamper resistance ranges from simple features like glue or epoxy to more complex devices that render themselves inoperable or encrypt all data transmissions between individual chips, or use of materials needing special tools and knowledge. That is, tamper resistance is a protection against physical destruction as well as destruction and interception of the stored data. One example is tamper meshes or active meshes, where the secure area is surrounded with wires forming space-filling curve, wherein an alarm goes off if a wire is broken or if two signals short together. Such a mesh also blocks signals inside the secure area from inspection.

The antenna of the secure arrangement is provided in an external part, here referred to as an external contactless card reader 20, which is connected to the card reader via a feed line 40. The external contactless card reader 20 can be put e.g. inside a sticker, which would allow the owner of the card reader to attach the antenna in a place which is convenient for the paying customer to reach. The antenna could also be part of a different construction, for example a stand which primary intention is to keep the external contactless card reader 20 in place. Moreover, the external contactless card reader can be a mobile to that extent that it can be moved closer to the customer to ease the tapping.

Hence, the external contactless card reader 20 comprises a short-distance communication antenna 21 configured for converting an electromagnetic signal comprising card data, received from a contactless payment card 30, into an analogue signal.

Short distance communication, as is the term that may be used herein, refers to an communication using signals that propagate a short distance, whereby communication is typically established by bringing the communicating devices in close vicinity e.g. within 10, 15 or 20 cm reach. A typical example is near field communication, NFC. In this disclosure, NFC will be used as an example. However, the teachings should not be considered limited thereto, but it must be considered applicable to other similar protocols as well.

The short-distance communication antenna is for example an NFC antenna. The short-distance communication antenna has a limited communication range. NFC, though, is very short-range, and work over distances of 5 cm at most. However, a general security feature of contactless cards is that they should not transmit payment information further than 10 cm from a reader. However, it may be possible to pick up signals even at larger distance e.g. up to 45 cm. The short-distance communication antennas are often simple loops of wire, occupying as much surface area as the device allows. The loops may be circular, square, and rectangular and are basically inductors that induce a magnetic field, which further (via mutual coupling) induces an analogue signal in the card reader's antenna when they are closely placed.

The feed line 40 is configured for transferring the analogue signal between the external contactless card reader 20 and the card reader terminal. A feed line is per definition is the cable or transmission line that connects the antenna with the radio transmitter or receiver. In a receiving antenna it transfers the tiny radio voltage induced in the antenna by the radio wave to the receiver. In order to carry radio current efficiently, feed lines are made of specialized types of cables called transmission lines. The most widely used types of feed lines are coaxial cable, twin-lead, ladder line, and at microwave frequencies, waveguide. The feed line is typically between 30 cm and 200 cm long and thereby enables the merchant to relatively freely place the tap zone in a desired place.

In accordance with the invention, the secure area in the card reader terminal comprises an analogue to digital A/D converter 151 for digitizing the analogue signal to a digital signal that can be processed by the secure controller 17. One main concept is that the point of digitization occurs inside the secure area. Thus, the digital signal is never present outside the secure area.

According to some aspects of the disclosure, the secure area of the card reader terminal comprises a short distance receiver circuitry 15. The receiver circuitry 15 typically samples, demodulates and decodes a received analogue signal. The A/D converter 151 is located inside the short distance receiver circuitry 15.

For NFC payments the point of digitization of the signal comprising the card information occurs when the data is processed by a NFC receiver circuitry, also called NFC controller, which is the part that converts the analogue signal to a digital signal. In order to comply with existing standards for contactless payments the signal must be protected to 16 points from the point of digitisation. Hence, the NFC controller needs to be placed within the secured area and a feedline such as a cable is used to enable the signal to propagate into the secured area.

In order to transfer the tiny radio voltage induced in the antenna by the radio wave to the receiver impedance matching may be used. Impedance matching is the practice of designing the input impedance of an electrical load or the output impedance of its corresponding signal source to maximize the power transfer or minimize signal reflection from the load. The impedance matching is e.g. performed by antenna matching circuits forming a matching network that takes into account the impedance of source and load as well as the frequencies that are used. In the security arrangement of FIG. 3 antenna matching circuits 13a, 23 may be positioned on both sides of the feedline.

According to some aspects, the external contactless card reader 20 comprises at least one antenna matching circuit 23 positioned between the short-distance communication antenna 21 and the A/D converter 151. This antenna matching circuit 23 is configured for matching frequency characteristics of the short-distance communication antenna 21 with frequency characteristics of the feed line, or with frequency characteristics feed line in combination with frequency characteristics of a connection point 51 of the feed line in the card reader terminal. According to some aspects, at least one antenna matching circuit 13a is placed in the card reader terminal 10. The matching circuit 13a is then adapted to match frequency characteristics of the feed line 40 in combination with with frequency characteristics of a connection point 52 of the feed line in the external contactless card reader, with the frequency characteristics of a connection point 51 of the feed line in the card reader terminal.

In case of a long cable, the impedance of the connection point 51 of the feed line in the card reader terminal may be negligible in relation to the impedance of the feedline. Then the matching circuit 13a is adapted to match the frequency characteristics of the feed line 40, with the frequency characteristics of a connection point 51 of the feed line in the card reader terminal.

As discussed above it may be desirable to be able to also use an internal short distance antenna 11 in the card reader terminal 10. The short-distance communication antenna 21 in the external contactless card reader 20 is then denoted "a first short-distance communication antenna 21" The card reader terminal 10 then comprises a second short-distance communication antenna 11. It is then possible to use the same receiver circuitry 15 e.g. a NFC controller for both antennas. Hence, the first and second short-distance communication antennas are both connected to the short distance receiver circuitry 15.

A switch arrangement may be used for switching between the antennas. According to some aspects, card reader terminal 10 comprises a switch arrangement 14 configured to connect at least one of the first and second short-distance communication antennas to the receiver circuitry 15. The switch arrangement is configured to enable none, one or several connected short distance antennas. One scenario is that both antennas are by default active, but that as soon as activity is detected at one of the antennas the other one/or ones is automatically disabled. Alternatively the switch arrangement may be manually controlled by the merchant through hardware and/or software.

Furthermore, the second short-distance communication antenna may be equipped with a matching circuit 13b. The input impedance in the connection point 52 depends on the parameters of the feed line (e.g., length and characteristic impedance) as well as the impedance of the load connected in the connection point 51, i.e., the card reader terminal 10. In the same manner the input impedance in the connection point 52 depends on the parameters of the feed line and the impedance of the load connected in the connection point 51, i.e., the external contactless card reader 20.

In other words, according to some aspects, the card reader terminal 10 comprises 20 at least one antenna matching circuit 13b positioned between the internal short-distance communication antenna 11 and the A/D converter 151. The antenna matching circuit 13b is for example configured to match frequency characteristics of the second short-distance communication antenna 21 with frequency characteristics of a connection point 53 in the card reader terminal. The matching circuit 13b is configured to match the impedance of the load of the respective sides of the matching circuit, wherein one load comprises at least the second short-distance communication antenna 11 and the other load comprises at least the switch arrangement 14 and the circuitry of the secure area 19.

Figure 4:
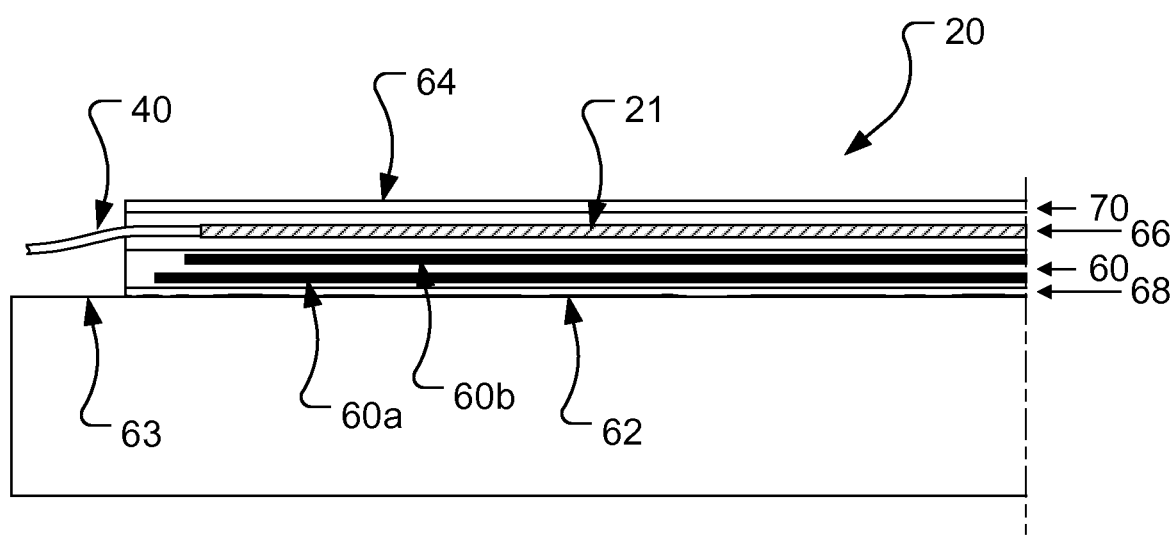
FIG. 4 illustrates schematically a side view of an external short-distance communication antenna and its internal components.

With reference now made to FIG. 4, illustrating schematically a side view of the external contactless card reader 20 and its internal components, the card reader 20 may comprise an electromagnetic shield 60 to protect its internal circuitry, including at least the short-distance communication antenna 21, from magnetic and/or electromagnetic interference (EMI). EMI is basically disruptive electromagnetic energy which, if reaching the antenna 21 or the matching circuit 23, may disrupt proper operation of the external contactless card reader 20.

In particular, the electromagnetic shield 60 is configured to prevent or at least mitigate the negative effects otherwise caused by metal surfaces in the immediate vicinity of the short-distance communication antenna 21. When placed on or close to a metal surface, the short-distance communication antenna 21 may generate eddy currents in the metal surface, which eddy currents produce a magnetic flow that counteracts or disrupts the magnetic field of the antenna 21. To prevent this, the electromagnetic shield 60 of the external contactless card reader 20 may comprise a metallic layer that shields the antenna 21 from the underlying surface to ensure that the metal environment of the card reader 20 remains the same no matter where the card reader 20 is placed or located. Preferably, the electromagnetic shield 60 further comprises a ferrite layer that shields the short-distance communication antenna 21 from the metallic layer of the electromagnetic shield, so as to prevent "self-induced" eddy currents and disruptive magnetic flows from being produced by the metallic layer of the electromagnetic shield. By adapting the short-distance communication antenna 21 and the matching circuit 23 to the metallic layer and the optional ferrite layer of the electromagnetic shield 60, proper operation of the external contactless card reader 20 can be maintained also in metal environments.

In the embodiment illustrated in FIG. 4, the external contactless card reader 20 is substantially flat and may have a thickness in the range of 0.5-5 mm. The card reader 20 has a bottom surface 62 that is intended to rest on, or be attached to, an underlying surface 63, such as a surface of a table or a checkout counter, and a top surface 64 intended to face a user of the card reader 20, i.e. a cardholder that is about to initiate a financial transaction by tapping the tap zone of the card reader 20 using a contactless payment card 30. The shape and size of the card reader 20 may vary in dependence of the intended use and location of the card reader, and the requirements of the short-circuit communication antenna 21. In typical applications, the flat card reader 20 may have a substantially circular or substantially rectangular shape with a surface area in the range 1-100 cm2.

As illustrated in the drawing, the external contactless card reader 20 may be a substantially flat, multi-layer construction comprising a plurality of substantially parallel layers or elements providing the desired functionality of the card reader 20.

The main component of the contactless card reader 20 is an antenna layer 66 comprising the short-distance communication antenna 21 and preferably also the antenna matching circuitry 23 (not shown). The short-distance communication antenna 21 is typically a loop antenna. As shown in previous drawings, the short-distance communication antenna 21 of the antenna layer 66 is connected to the card reader terminal 10 via the physical connection 40.

In this embodiment, the electromagnetic shield 60 is constituted by a shielding layer that is applied under the antenna layer 66, i.e. between the antenna layer 66 and the bottom surface 62 of the card reader 20, to shield the antenna layer 66 from the underlying surface 63. The electromagnetic shield 60 comprises a metallic layer 60a comprising an electrically conductive metal. The metallic layer 60a may, for example, comprise a metal sheet or a metal mesh. In one exemplary embodiment, the metallic layer 60a comprises an aluminium foil. The metallic layer 60a is preferably arranged to cover the entire short-distance communication antenna 21, meaning that the antenna 21 is arranged inside, and preferably well inside, the circumference of the metallic layer 60a in a direction perpendicular to the layers of the card reader 20.

Furthermore, the electromagnetic shield 60 comprises a ferrite layer 60b, arranged between the antenna layer 66 and the metallic layer 60a. The ferrite layer 60b may, for example, be constituted by a ferrite foil. The properties of the ferrite of effectively conducting magnetic flux while being a poor electrical conductor make the ferrite layer 60b prevent eddy currents from arising in the metallic layer 60a while ensuring proper operation of the short-distance communication antenna 21. As illustrated in the drawing, the ferrite layer 60b is also arranged to cover the entire short-distance communication antenna 21, meaning that the antenna 21 is arranged inside the circumference of the ferrite layer 60b in a direction perpendicular to the layers of the card reader 20. Preferably, to effectively prevent eddy currents from arising in the metallic layer 60a, the antenna 21 should be arranged entirely within the circumference of the ferrite layer 60b in a direction perpendicular to the layers of the card reader, such that the ferrite layer 60b extends outside of the circumference of the antenna 21. At the same time it has been found that the ferrite layer 60b should not extend too much outside of the circumference of the antenna 21 since this may negatively effect antenna field distribution and thus prevent proper operation of the external contactless card reader 20. The "ferrite overhang", i.e. the distance with which the ferrite layer 60b extends outside the circumference of the antenna 21 as seen from a direction that is perpendicular to the antenna and ferrite layers, may depend on the properties of the antenna 21, the metal layer 60a and the ferrite layer 60b, but should preferably be within the range of 1-10 mm. In some embodiments in which the short-distance communication antenna 21 is an NFC loop antenna, an overhang of approximately 5 mm has been found suitable.

Consequently, according to one aspect of the disclosure, the external contactless card reader 20 comprises a lower metallic layer 60a, a middle ferrite layer 60b arranged on top of the metallic layer 60a, and a top antenna layer 66 arranged on top of the ferrite layer 60b, wherein the surface areas of the layers increase in the order from top to bottom to ensure proper operation of the short-distance communication antenna 21. In this regard, the "surface area" of the antenna layer refers to the surface area defined by the circumference of the antenna coil.

In the exemplary embodiment illustrated in FIG. 4, the external contactless card reader 20 is realized in form of a flat antenna sticker, e.g. an NFC reader sticker, and comprises an adhesive layer 68 applied to the bottom surface of the shielding layer 60 in order for the card reader 20 to be easily attached to the underlying surface 63. In this context it should be noted that the underlying surface 63 does not need to be horizontal and that the external contactless card reader 20 may be attached to virtually any surface. Also illustrated in the drawing is an optional top layer 70 of the external contactless card reader 20, provided on top of the antenna layer 66. The top layer 70 may, for example, comprise a picture or a symbol indicating to the cardholder that this is the tap zone where the cardholder should tap his contactless payment card.

The components of the secure arrangement disclosed herein may also comprise additional components such as power amplifiers in order to e.g. enhance signal transfer.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computerreadable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from NFC has been used herein to explain the example embodiments, this should not be seen as limiting the scope of the example embodiments to only the aforementioned system. Other wireless systems may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. An apparatus, comprising:
   an external contactless card reader that includes a first short-distance communication antenna configured to convert an electromagnetic signal that includes card data, received from a contactless payment card, into an analog signal, wherein the external contactless card reader is not configured to digitize the analog signal; and
   a card reader terminal that is connected to the external contactless card reader using a feed line, wherein the card reader terminal includes:
      a secure area within the card reader terminal;
      a short-distance receiver circuit located in the secure area within the card reader terminal, wherein the short-distance receiver circuit includes an A/D converter and the A/D converter is configured to convert the analog signal, received via the feed line from the external contactless card reader, to a digital signal;
      a secure controller located in the secure area within the card reader terminal, wherein the secure controller is configured to perform a financial transaction based on the card data included in the digital signal;
      a first antenna matching circuit positioned between the first short-distance communication antenna and the A/D converter;
      a second short-distance communication antenna, wherein the first and second short-distance communication antennas are connected via separate paths to the short-distance receiver circuit; and
      a switch arrangement configured to select one of the first or second short-distance communication antennas for connection to the short-distance receiver circuit.

2. The apparatus of claim 1, wherein the first antenna matching circuit is configured to match frequency characteristics of the first short-distance communication antenna with at least one of:
   frequency characteristics of the feed line configured to transfer the analog signal from the external contactless card reader to the card reader terminal; or
   frequency characteristics of the feed line in combination with frequency characteristics of a connection point of the feed line in the card reader terminal.

3. The apparatus of claim 1, wherein the card reader terminal includes a second antenna matching circuit positioned between the second short-distance communication antenna and the A/D converter, wherein the second antenna matching circuit is configured to match frequency characteristics of the second short-distance communication antenna with frequency characteristics of a connection point in the card reader terminal.

4. The apparatus of claim 1, wherein the feed line is a twin-lead cable or a coaxial cable.

5. The apparatus of claim 1 wherein the feed line is between 30 cm and 200 cm long.

6. The apparatus of claim 1, wherein the second short-distance communication antenna is a Near-Field Communication antenna.

7. The apparatus of claim 1, wherein the second short-distance communication antenna has a communication range of up to 10 cm.

8. The apparatus of claim 1, wherein the secure area is tamper proof.

9. The apparatus of claim 8, wherein the secure area is surrounded by a tamper mesh that includes electrically conductive traces.

10. The apparatus of claim 1, wherein the financial transaction comprises a contactless payment.

11. The apparatus of claim 1, wherein the card reader terminal further includes at least one antenna matching circuit for matching frequency characteristics of the second short-distance communication antenna with frequency characteristics of a connection point in the card reader terminal.

12. A method, comprising:
  receiving, via a first short-distance communication antenna in an external contactless card reader, an electromagnetic signal that includes card data from a contactless payment card;
  converting, by the first short-distance communication antenna, the electromagnetic signal into an analog signal;
  transferring the analog signal from the external contactless card reader to a card reader terminal without digitizing the analog signal at any point between the first short-distance communication antenna and the card reader terminal, wherein the card reader terminal is connected to the external contactless card reader via a feed line, and wherein the card reader terminal includes:
    a secure controller, located in a secure area within the card reader terminal, configured to perform financial transactions;
    a short-distance receiver circuit, located in the secure area within the card reader terminal, wherein the short-distance receiver circuit includes an A/D converter configured to convert the analog signal to a digital signal that can be processed by the secure controller;
    a second short-distance communication antenna, wherein the first and second short-distance communication antennas are connected via separate paths to the short-distance receiver circuit; and
    a switch arrangement configured to select one of the first or second short-distance communication antennas for connection to the short-distance receiver circuit; and
  matching, by a first antenna matching circuit positioned between the first short-distance communication antenna and the A/D converter, one or more frequency characteristics of the first short-distance communication antenna with frequency characteristics of the feed line.

* * * * *